United States Patent [19]

Kobayashi

[11] Patent Number: 4,523,566
[45] Date of Patent: Jun. 18, 1985

[54] KNOCKING CONTROL SYSTEM IN ENGINE
[75] Inventor: Tatsuo Kobayashi, Shizuoka, Japan
[73] Assignee: Toyota Jidosha Kabushiki Kaisha, Toyota, Japan
[21] Appl. No.: 476,338
[22] Filed: Mar. 17, 1983
[30] Foreign Application Priority Data Aug. 24, 1982 [JP] Japan ............................. 57-127865[U]

[51] Int. Cl.³ .................................................. F02P 5/04
[52] U.S. Cl. ........................................ 123/425; 73/35
[58] Field of Search ...................... 123/425, 435; 73/35

[56] References Cited
U.S. PATENT DOCUMENTS 4,279,143 7/1981 Guipaud .......................... 123/425 X Primary Examiner—Tony M. Argenbright
Attorney, Agent, or Firm—Kenyon & Kenyon

[57] ABSTRACT

In a knocking control apparatus for a spark-ignition internal combustion engine, the full-wave rectified output from a vibration sensor is integrated and summed with a constant offset voltage to provide a variable reference signal. The integration time constant is selected to be no more than approximately five times the rise time from inception to maximum value of each knocking occurrence, such that the reference value can remain above the envelope of the background vibrations of the engine, which have a much longer rise time than do the knocking vibrations, without being set too high to detect knocking in a cylinder remote from the location of the vibration sensor. The rectified output of the vibration sensor is directly compared with the reference signal to generate a knocking control pulse each time the alternating sensor output exceeds the reference value.

8 Claims, 4 Drawing Figures

KNOCKING CONTROL SYSTEM IN ENGINE

BACKGROUND OF THE INVENTION

1. Field of the Invention

This invention relates to knocking control systems in engines, and more particularly to a knocking control system capable of detecting knocking in an internal combustion engine and retarding ignition timing when knocking occurs.

2. Description of the Prior Art

The conventional knocking control system includes a vibration pickup for detecting engine vibrations; an output from this vibration pickup is full-wave rectified by a full-wave rectifier and thereafter integrated by an integrator, whereby a mean value is extracted. An output signal from this integrator is summed with a voltage of a predetermined value by an adder, whereby a reference voltage can be extracted. This reference voltage is inputted to a comparator, and the output signal from the vibration pickup is also inputted to the comparator, where the magnitudes of the output signal from the vibration pickup and the reference voltage are compared with each other. This knocking control system determines an occurrence of knocking when the output signal from the vibration pickup exceeds the reference voltage, whereupon the spark advance is controlled to lag through predetermined degrees of crankshaft angle.

However, in the conventional knocking control system, there has been a problem because the integration time of the integrator is as long as 400 msec, whereby the maximum value of the output from the integrator is lowered and there is a possibility that the maximum value of the background noise amplitude will exceed the reference voltage, so that an incorrect indication of knocking will be detected. In addition, when vibrations of a multi-cylinder engine are detected by a vibration pickup, vibrations due to knocking occurring in a cylinder remote from the vibration pickup are attenuated, while opening and closing sounds of valves near the vibration pickup are high in noise level so that if the added voltage is high enough to offset the background noise, when knocking occurs in a cylinder remote from the vibration pickup, the knocking cannot be detected.

To overcome the above problem, it has been proposed to preset the spark advance of a cylinder remote from the vibration pickup to lag several degrees so as to reduce the frequency of occurrences of knocking. However, this results in increased fuel consumption.

SUMMARY OF THE INVENTION

The present inventor, by comparing the vibration waveform due to knocking with the vibration waveform due to noises of opening and closing of the valves, has found that the envelope of the vibration waveform due to knocking reaches its maximum value in a short period of time, whereas the envelope of the vibration waveforms due to the valve noises reaches its maximum value in a long period of time as compared with the vibration waveform during knocking.

The present invention has been developed based on the above-described knowledge and has for its object the provision of a knocking control system capable of easily determining the occurrence of knocking in a cylinder remote from the vibration pickup and of controlling the ignition timing to eliminate such knocking.

To this end, according to the present invention, in an otherwise conventional knocking control system, the integration time of an integrator is made to be less than substantially five times the length of time from the inception of vibrations due to knocking to the maximum value thereof. As a result, the variation of background engine vibrations can be followed closely, and consequently the occurrence of knocking can be determined even when the engine vibrations due to the knocking are attenuated due to distance of the knocking cylinder from the vibration sensor.

From the viewpoint of detecting knocking in a cylinder remote from the vibration pickup, it has been proposed to mount a plurality of vibration pickups corresponding to the respective cylinders. In that case, however, the vibration pickups, control circuits and the like are needed in plural numbers, thus resulting in increased cost of production. In contrast thereto, the present invention can offer the special advantage that the occurrence of knocking in a cylinder remote from the vibration pickup can be easily determined without entailing any increased cost of production.

BRIEF DESCRIPTION OF THE DRAWINGS

FIG. 3(2) is a diagram showing a signal wave form when knocking does not occur.

DETAILED DESCRIPTION OF THE PREFERRED EMBODIMENT

Figure 1:
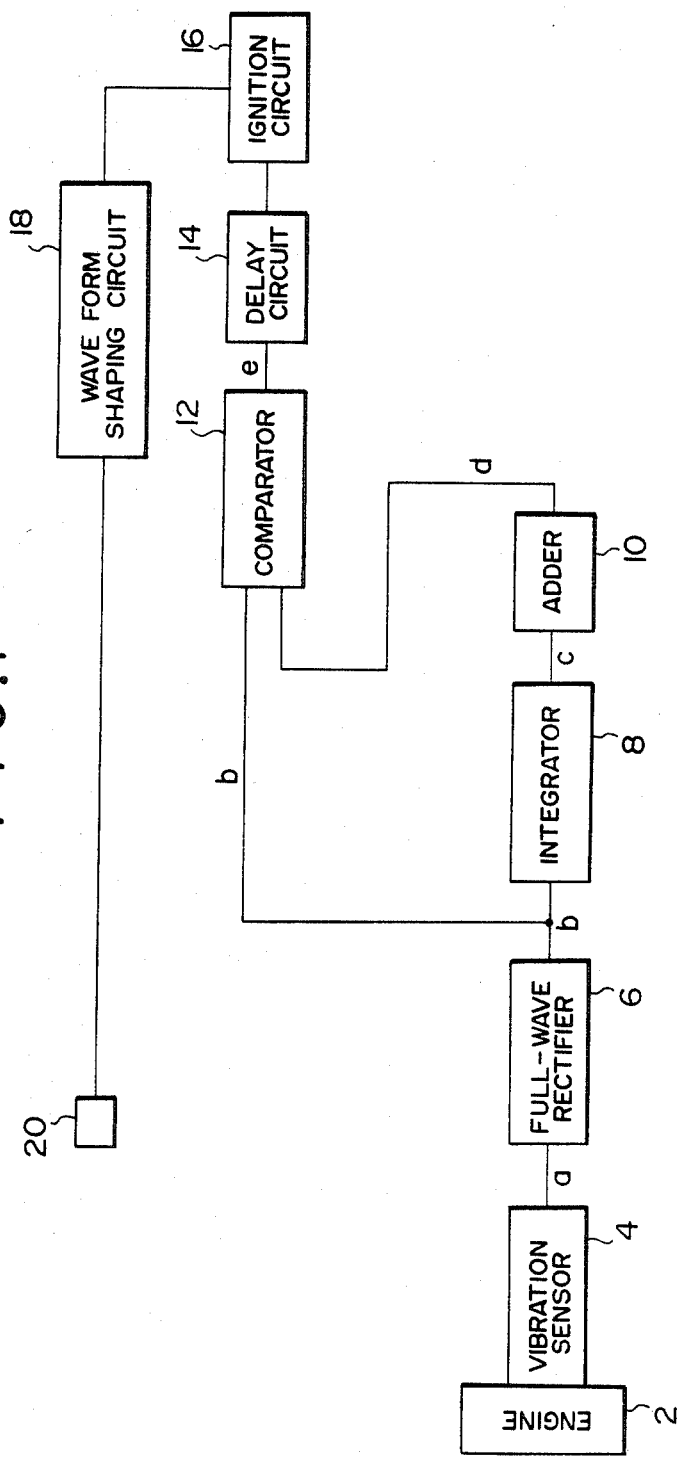
FIG. 1 is a basic block diagram showing one embodiment of the present invention.

One embodiment of the present invention will be described with reference to the drawings. FIG. 1 shows a specific block diagram of this preferred embodiment.

Secured to the main body of engine 2 is vibration sensor 4 constituted by a microphone or the like, and this vibration sensor 4 is connected to a full-wave rectifier 6. The full-wave rectifier 6 is connected to one of two input terminals of a comparator 12 through an integrator 8 and an adder 10, and further is directly connected to the other of the input terminals of the comparator 12. The comparator 12 is connected to an ignition circuit 16 through a delay circuit 14. Connected to the ignition circuit 16 through a waveform shaping circuit 18 is a pickup 20 secured to a distributor, for initiating an ignition timing signal.

Figure 2:
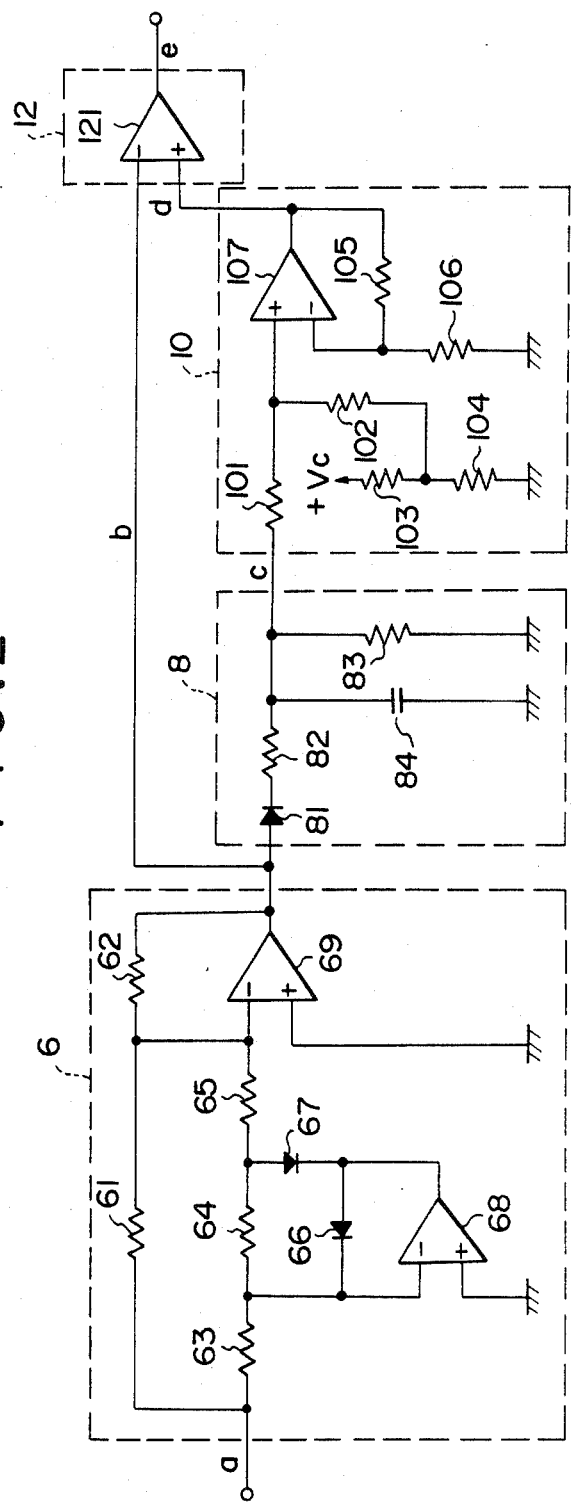
FIG. 2 is a specific circuit diagram of the above embodiment.

FIG. 2 shows specific circuits of the essential portions of this embodiment.

The full-wave rectifier 6 is a so-called absolute value circuit including operational amplifiers 68 and 69, which are arranged as inverting amplifiers each having a negative input terminal, a positive input terminal and an output terminal. The negative input terminal and the output terminal of the operational amplifier 68 are connected to each other by a diode 66, the diode being connected in the forward direction from the output terminal to the negative input terminal.

Further, the output terminal of the operational amplifier 68 is connected to the negative input terminal of the operational amplifier 69 through a diode 67 and a resistor 65, the diode 67 being connected in the forward direction from the resistor 65 to the output terminal of the operational amplifier 68. The cathode of the diode 66 is connected to the anode of the diode 67 through a resistor 64. The cathode of the diode 66 also is connected to the vibration sensor 4 through a resistor 63. The negative input terminal and the output terminal of the operational amplifier 69 are connected to each other through a resistor 62. Further, an input terminal of the operational amplifier 69 is connected through a resistor 61 to the junction between the resistor 63 and the vibration sensor 4.

An engine vibration signal "a" outputted from the vibration sensor 4 is an alternating current. The positive component of this alternating current is inverted by the operational amplifier 68 and tends to lower the voltage at the negative input terminal of the operational amplifier 69. The positive input of the operational amplifier 69 is grounded, so as to hold the voltage thereof at 0. Consequently, amplifier 69 outputs a positive voltage from its output terminal corresponding to the negative voltage outputted from the operational amplifier 68. In addition, the negative component of the alternating current from vibration sensor 4 acts to lower the voltage at the negative input terminal of the operational amplifier 69 through the resistor 61, so that the operational amplifier 69 also outputs a positive voltage corresponding to the negative component of the alternating current from vibration sensor 4.

The negative component of the alternating current from vibration sensor 4 also is inverted by the operational amplifier 68. However, the voltage thus inverted and the voltage prior to the inversion are short-circuited through the diode 66 to offset each other. In consequence, a positive full-wave rectified voltage corresponding to the absolute value of the engine vibration signal "a" appears at the output terminal of the operational amplifier 69.

In the rectifier 6, the resistors should be selected according to the following equation so that distortions in the full-wave rectified waveform can be avoided:

$$R_3/R_2 = R_1/2R_4,$$

where the resistance values of the resistors 61, 63, 64 and 65 are represented by $R_1$, $R_2$, $R_3$ and $R_4$, respectively.

The integrator 8 comprises a diode 81, resistors 82, 83, and a capacitor 84. In the integrator 8, the value of the resistor 82 and the capacity of the capacitor 84 are suitably selected to determine an integration time constant that is less than substantially five times the length of time from the inception of vibrations due to knocking to the maximum value thereof. The reason why such an integration time constant is selected is that, if the integration time constant is set to be more than substantially five times the length of time from the inception of vibrations due to knocking to the maximum value thereof, then the maximum output from the integrator becomes low, whereby the occurrence of knocking, when the engine vibrations are attenuated, cannot be determined. Furthermore, it is preferable that this integration time constant be substantially equal to the length of time from the inception of vibrations due to knocking to the maximum value thereof.

The adder 10 comprises resistors 101, 102, 103, 104, 105 and 106 and an operational amplifier 107, and the comparator 12 comprises an operation amplifier 121.

Figure 3:
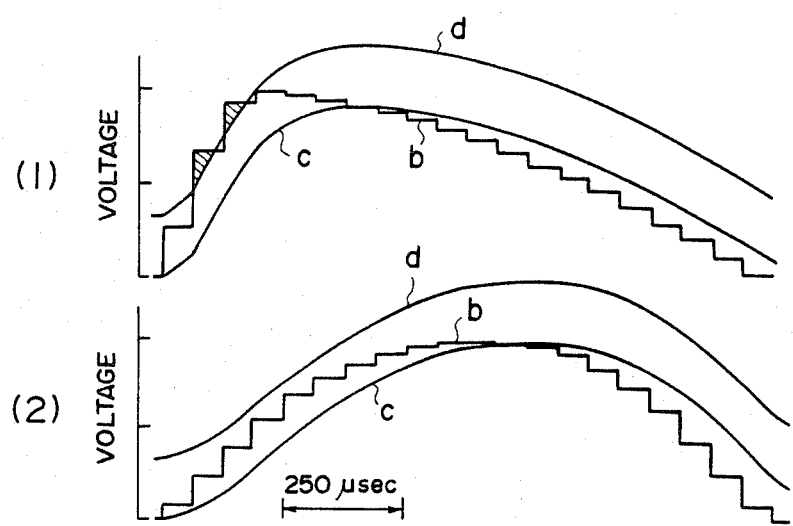
FIG. 3(1) is a diagram showing a signal wave form when knocking occurs.
Figure 4:
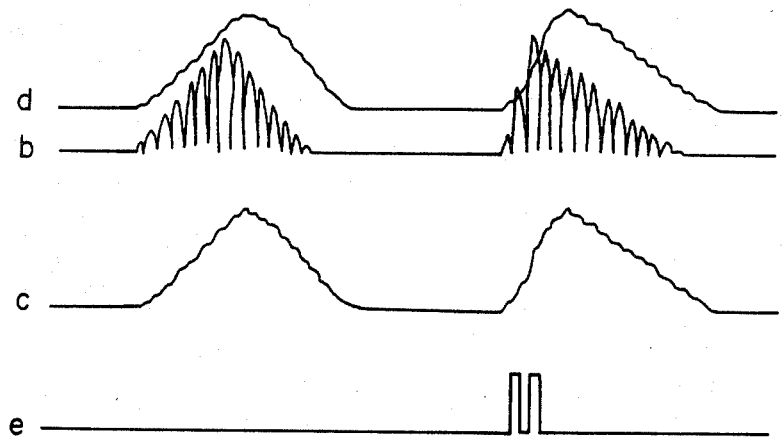
FIG. 4 is a diagram showing signal waveforms b, c, d, and e at respective portions in the above embodiment.

The operation of this embodiment will now be described. Engine vibrations generated in the main body of engine 2 are detected by the vibration sensor 4 and outputted as the engine vibration signal "a". This engine vibration signal "a" is full-wave rectified by the full-wave rectifier 6 and turned into a full-wave rectified signal "b" as shown in FIGS. 3 and 4. Additionally, to be easily recognized, the full-wave rectified signal "b" is indicated by a rectangular shape. Furthermore, FIG. 3(1) shows a signal waveform when knocking occurs, and FIG. 3(2) shows a signal waveform of the background noises when knocking does not occur. As apparent from FIGS. 3(1) and 3(2), the engine vibrations due to knocking in the range of frequencies from about 5 to 10 KHz have a short rise to the maximum value as compared with the engine vibrations due to the background noises.

The above-described full-wave rectified signal "b" is inputted directly to one of the input terminals of the comparator. Signal "b" also is integrated by the integrator 8, having an integration time constant of 1 msec or less, and is turned into an integrated signal "c". The integrated "c" is summed with an offset voltage in the adder 10, turned into a reference signal "d", and inputted to the other of the input terminals of the comparator 12. In comparator 12, the full-wave rectified signal "b" is compared with the reference signal "d", and when the full-wave rectified signal "b" exceeds the level of the reference signal "d", the comparator 12 outputs a pulse-like knocking control signal "e", as shown in FIG. 4. This knocking control signal "e" is inputted to the delay circuit 14 and thereafter inputted to the ignition circuit 16, upon being delayed for a period of time corresponding to the number of pulses of the knocking control signal "e". A basic ignition signal from the pickup 20 secured to the distributor is also inputted to the ignition circuit 16 through the waveform shaping circuit 18. The aforesaid basic ignition signal is corrected by use of the knocking control signal "e" inputted from the delay circuit 14, and the corrected ignition signal is outputted to a spark plug. As a result, the spark advance is delayed through predetermined degrees of angle, and the ignition is effected without knocking.

I claim:
1. A knocking control apparatus for a spark-ignition internal combustion engine, the apparatus comprising:
   a vibration sensor responsive to engine vibrations, including vibrations due to knocking, for producing an alternating voltage engine vibration signal;
   a rectifier, having an input connected to the vibration sensor and an output, for providing a rectified engine vibration signal from the sensor at the output of the rectifier;
   an integrator having an input connected to the output of the rectifier, and an output for delivering an integrated value of the rectified engine vibration signal, the integrator having a charge time constant less than substantially five times the period from inception to maximum value of vibrations due to knocking and a discharge time constant short enough to reduce the integrator output substantially to zero between succesive ignition cycles;
   an adder having an input connected to the output of the integrator and an output, the adder providing an offset voltage signal and summing said offset signal with the integrated engine vibration signal to produce a reference signal at the output of the adder;
   a comparator having a first input connected directly to the output of the rectifier, a second input connected to the output of the adder, and an output, for comparing said rectified engine vibration signal with said reference signal, and for producing a knocking control pulse at the output of the comparator whenever the instantaneous level of said rectified engine vibration signal exceeds the reference signal; and a delay circuit having an input connected to the output of the comparator and an output for delivering an ignition control signal to an ignition circuit of the engine for causing a delay in a spark ignition signal that is a function of the number of knocking control pulses per ignition cycle.

2. A knocking control apparatus for an internal combustion engine according to claim 1 wherein the integration time constant of said integrator is about 1 ms or less.

3. A knocking control apparatus for an internal combustion engine according to claim 1 wherein said vibration sensor is a microphone.

4. A knocking control apparatus for an internal combustion engine according to claim 1 wherein said rectifier is a full-wave rectifier.

5. A knocking control apparatus for an internal combustion engine according to claim 4 wherein said full-wave rectifier comprises:

a first inversion amplifier, having an input coupled to the vibration sensor and an output, said first inversion amplifier being arranged to provide only a negative voltage at the output thereof corresponding to the inverted positive component of the alternating voltage from said vibration sensor and a second inversion amplifier, having an input coupled to both the vibration sensor and to the output of the first inversion amplifier and an output, the second inversion amplifier being arranged to provide only a positive voltage at the output thereof corresponding to the inverted negative voltage from the output of the first inversion amplifier combined with the inverted negative component of the alternating voltage from said vibration sensor.

6. A knocking control apparatus for an internal combustion engine according to claim 1 wherein said integrator comprises a resistor and a capacitor for setting an integration time constant, and a diode for precluding a backward current to said rectifier.

7. A knocking control apparatus for an internal combustion engine according to claim 1 wherein said adder comprises an operational amplifier having an input coupled to the output from said integrator and to a source of an offset voltage having a predetermined value.

8. A knocking control apparatus for an internal combustion engine according to claim 1 wherein said comparator is an operational amplifier.

* * * * *